(12) United States Patent
Chang (10) Patent No.: US 11,215,524 B2
(45) Date of Patent: Jan. 4, 2022

(54) GAS LEAK MONITORING SYSTEM (71) Applicant: SAMIN SCIENCE CO., LTD., Gyeonggido (KR)

(72) Inventor: Hyo Cheol Chang, Incheon (KR)

(73) Assignee: SAMIN SCIENCE CO., LTD., Gyeonggido (KR)

( * ) Notice: Subject to any disclaimer, the term of this patent is extended or adjusted under 35 U.S.C. 154(b) by 0 days.

(21) Appl. No.: 16/678,032

(22) Filed: Nov. 8, 2019

(65) Prior Publication Data

US 2020/0370990 A1 Nov. 26, 2020

(30) Foreign Application Priority Data

May 23, 2019 (KR) .................. 10-2019-0060547

(51) Int. Cl.
*F16K 31/02* (2006.01)
*G01M 3/28* (2006.01)
*G05D 7/06* (2006.01)
*F17D 5/06* (2006.01)
*F17D 5/00* (2006.01)
*F17D 3/01* (2006.01)

(52) U.S. Cl.
CPC ........ *G01M 3/2815* (2013.01); *G05D 7/0635* (2013.01); *F17D 3/01* (2013.01); *F17D 5/005* (2013.01); *F17D 5/06* (2013.01); *G01M 3/28* (2013.01)

(58) Field of Classification Search
CPC .... G01M 3/2815; G01M 3/28; G05D 7/0635; F17D 5/06; F17D 5/005; F17D 3/01
USPC .................. 137/494, 487.5; 73/40, 40.9, 40.7
See application file for complete search history.

(56) References Cited

U.S. PATENT DOCUMENTS

| 5,361,622 A * | 11/1994 | Wall ................... G01M 3/2815 73/49.1 |
| 5,850,037 A * | 12/1998 | Mullins ............... G01M 3/2815 73/40.5 R |
| 2004/0163705 A1* | 8/2004 | Uhler ........................ F17D 5/06 137/79 |
| 2005/0224118 A1* | 10/2005 | Tornay ...................... F17D 5/06 137/624.11 |
| 2008/0184781 A1* | 8/2008 | Mulligan .............. G01M 3/022 73/40.5 R |
| 2008/0295895 A1* | 12/2008 | Vincent ............... G01M 3/2807 137/357 |
| 2011/0046903 A1* | 2/2011 | Franklin ............. G01M 3/2815 702/51 |
| 2011/0114202 A1* | 5/2011 | Goseco ..................... E03B 7/04 137/487.5 |
| 2011/0284500 A1* | 11/2011 | Rappl ....................... F17D 5/06 219/74 |

(Continued)

FOREIGN PATENT DOCUMENTS

KR 10-0160548 B1 5/1999

*Primary Examiner* — Minh Q Le
(74) *Attorney, Agent, or Firm* — The PL Law Group, PLLC (57) ABSTRACT

A gas leak monitoring system according to an embodiment of the present disclosure may be easily applied to a laboratory or the like to which a large amount of gas is supplied and also may detect a gas leak economically and efficiently. In addition, according to an embodiment of the present disclosure, it is possible to immediately check a gas leak and take a measure through a user terminal or a management module to prevent a large accident caused by the gas leak in advance.

4 Claims, 8 Drawing Sheets

(56) References Cited

U.S. PATENT DOCUMENTS

| | | | |
|---|---|---|---|
| 2013/0030577 A1* | 1/2013 | Jarrell | G01M 3/24 |
| | | | 700/282 |
| 2014/0121999 A1* | 5/2014 | Bracken | G01M 3/243 |
| | | | 702/51 |
| 2017/0003200 A1* | 1/2017 | McDowell | F17D 5/06 |
| 2018/0238765 A1* | 8/2018 | Gramespacher | G01M 3/2815 |
| 2019/0187678 A1* | 6/2019 | Muinda | G05B 13/048 |
| 2019/0234827 A1* | 8/2019 | Van Zyl | E03B 7/003 |
| 2020/0158595 A1* | 5/2020 | Winterholler | E03B 7/071 |
| 2020/0249115 A1* | 8/2020 | Kissick | F02D 33/003 |

* cited by examiner

GAS LEAK MONITORING SYSTEM

CROSS-REFERENCE TO RELATED APPLICATION

This application claims priority to Korean Patent Application No. 10-2019-0060547, filed on May 23, 2019, and all the benefits accruing therefrom under 35 U.S.C. § 119, the contents of which in its entirety are herein incorporated by reference.

BACKGROUND

1. Field

The present disclosure relates to a gas leak monitoring system.

2. Description of the Related Art

In general, gas used in homes and restaurants is supplied through a plurality of tubings from a gas supply source (e.g., a gas cylinder).

The gas is also used in the laboratory for various purposes. The gas used in the laboratory as above also reaches the point of use along a plurality of tubings connected from a gas reservoir or cylinder to the equipment.

Here, if a gas leak occurs in the tubing or its connection fitting area, the leaked gas may affect the analysis data and lead to an incorrect result. Further, the leaked gas may threaten the health of a user and also the leaked gas such as acetylene gas or hydrogen gas may lead to a major accident such as a gas explosion.

Thus, recently, in order to prevent an accident such as fire or explosion caused by gas, a gas leak inspection is regularly performed at homes and restaurants where gas is supplied. For example, in the prior art, a soapy water is applied to the connection portion of the valve to determine a gas leak by checking whether the volume of the soapy water changes. Recently, a gas leak checker is used to check whether gas is leaked.

In addition, in a place such as a laboratory where a gas supply amount and a gas use amount are high, various instruments and systems are used to prevent various accidents caused by a gas leak. Recently, a gas sensor for detecting a gas leak in a storage tank or tubing has been developed. However, a gas leak detection device equipped with the gas sensor is expensive and difficult to apply to a laboratory.

Thus, there is a need for a system that may be easily applied to a laboratory or the like where a large amount of gas is supplied and used and also may detect a gas leak economically and efficiently.

SUMMARY

The present disclosure is designed from the above background, and the present disclosure is directed to providing a gas leak monitoring system, which may be easily applied to a laboratory or the like where a large amount of gas is supplied and used and also may detect a gas leak economically and efficiently.

In addition, the present disclosure is directed to providing a gas leak monitoring system, which may monitor a gas supply status in real time and immediately check a gas leak and take a measure through a user terminal or a management module to prevent a large accident caused by the gas leak in advance.

The object of the present disclosure is not limited thereto, and other objects not mentioned herein will be clearly understood by those skilled in the art from the following description.

In one aspect, there is provided a gas leak monitoring system, which detects a leak of gas supplied through a supply tubing equipped with a supply valve, the gas leak monitoring system comprising: a pressure sensing module configured to detect a pressure of the gas in the supply tubing and output real-time tubing pressure data; a DB module configured to save the real-time tubing pressure data and normal tubing pressure data; and a server module configured to analyze the real-time tubing pressure data and the normal tubing pressure data transmitted from the DB module, determine a gas leak state when the real-time tubing pressure data deviates from the normal tubing pressure data, and perform one of safety actions to close the supply tubing or transmit gas leak data to a management module.

According to an embodiment of the present disclosure, the gas leak monitoring system of the present disclosure may be easily applied to a laboratory or the like to which a large amount of gas is supplied and also may detect a gas leak economically and efficiently.

In addition, according to an embodiment of the present disclosure, it is possible to immediately check a gas leak and take a measure through a user terminal or a management module to prevent a large accident caused by the gas leak in advance.

The effects of the present disclosure are not limited to the above, and other effects not mentioned herein will be clearly understood by those skilled in the art from the claims.

DETAILED DESCRIPTION

Hereinafter, some embodiments of the present disclosure will be described in detail with reference to exemplary drawings. In adding reference signs to components of each drawing, it should be noted that the same reference signs are assigned to the same components as much as possible even though they are shown in different drawings. Also, in describing the present disclosure, if it is determined that a detailed description of the related known structure or function may obscure the gist of the present disclosure, the detailed description thereof will be omitted.

In addition, in describing the components of the present disclosure, terms such as "first", "second", "A", "B", "(a)" and "(b)" may be used. These terms are only for distinguishing the corresponding component from another component, and the nature, order or sequence of the components are not limited by the terms. If a component is described as being "connected", "coupled" or "contacted" to another component, that component may be directly connected or contacted to another component, but it should also be understood that any other element (s) may be further "connected", "coupled" or "contacted" between these component.

Figure 1:
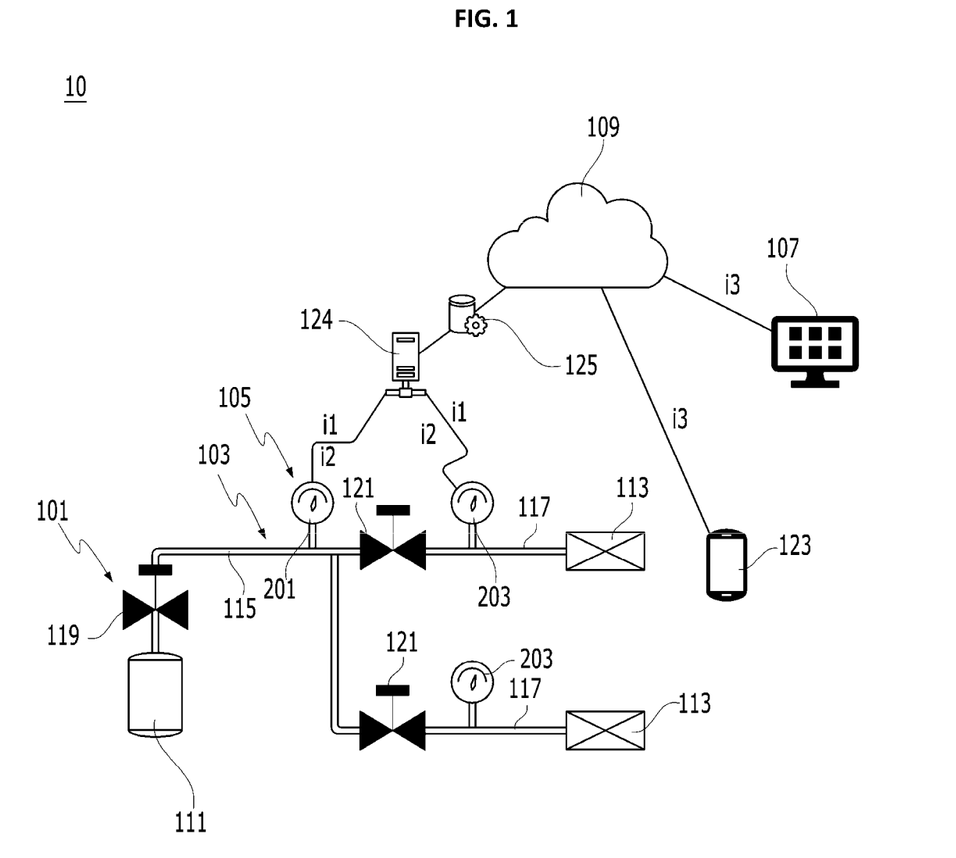
FIG. 1 is a diagram schematically showing a gas leak monitoring system according to an embodiment of the present disclosure.

FIG. 1 is a diagram schematically showing a gas leak monitoring system according to an embodiment of the present disclosure.

Figure 2:
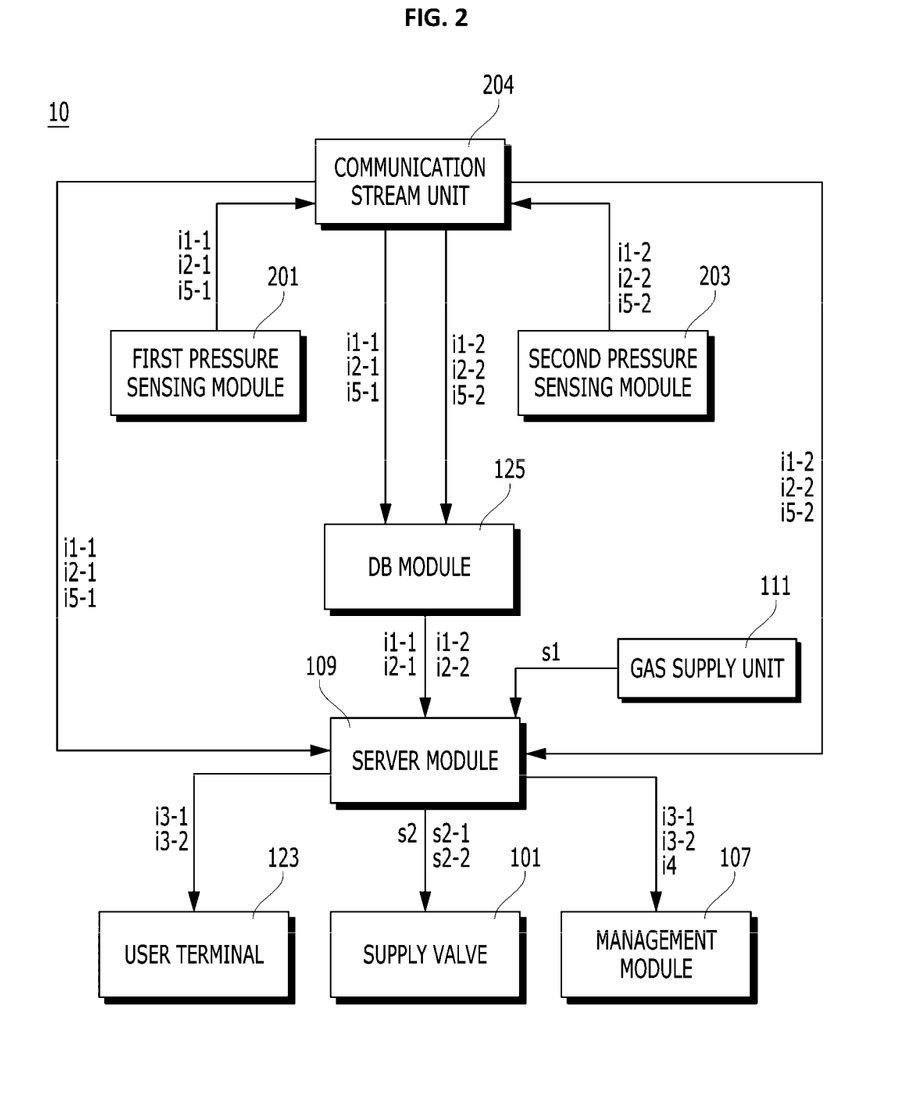
FIG. 2 is a block diagram showing the flow of a signal of the gas leak monitoring system of FIG. 1.

FIG. 2 is a block diagram showing the flow of a signal of the gas leak monitoring system of FIG. 1.

Figure 3:
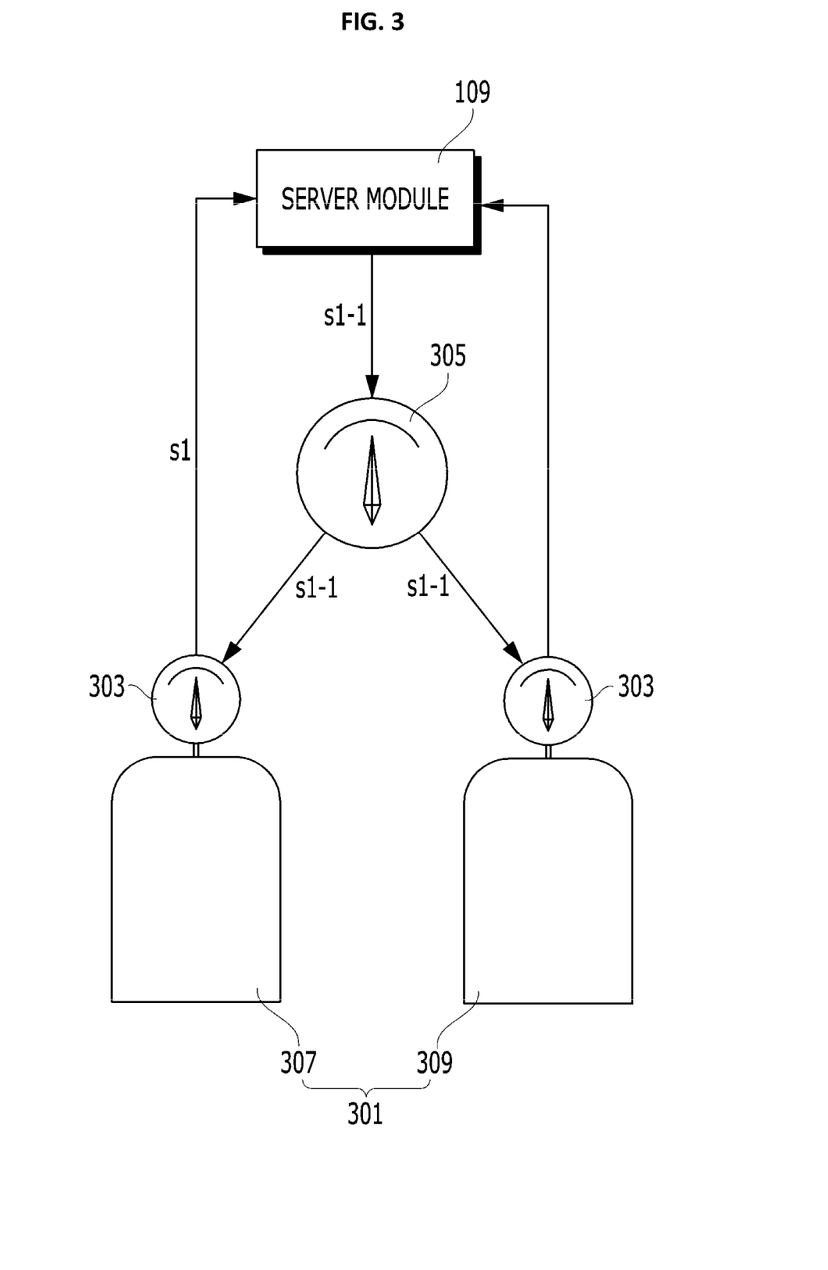
FIG. 3 is a diagram showing the configuration of a gas supply unit of FIG. 1 in more detail.

FIG. 3 is a diagram showing the configuration of a gas supply unit of FIG. 1 in more detail.

Figure 4:
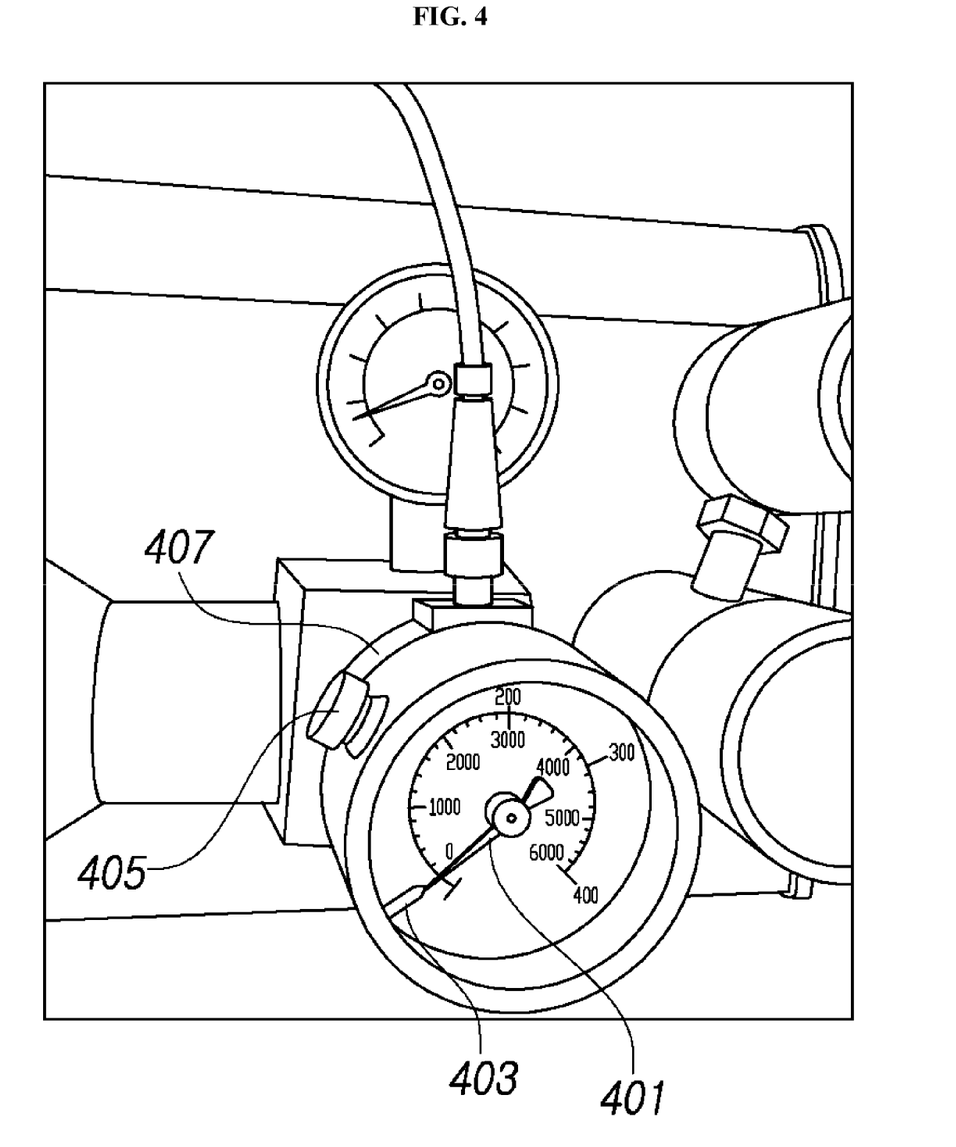
FIG. 4 is a photograph showing a structure of a residual gas detecting unit of FIG. 3.

FIG. 4 is a photograph showing a structure of a residual gas detecting unit of FIG. 3.

Figure 5:
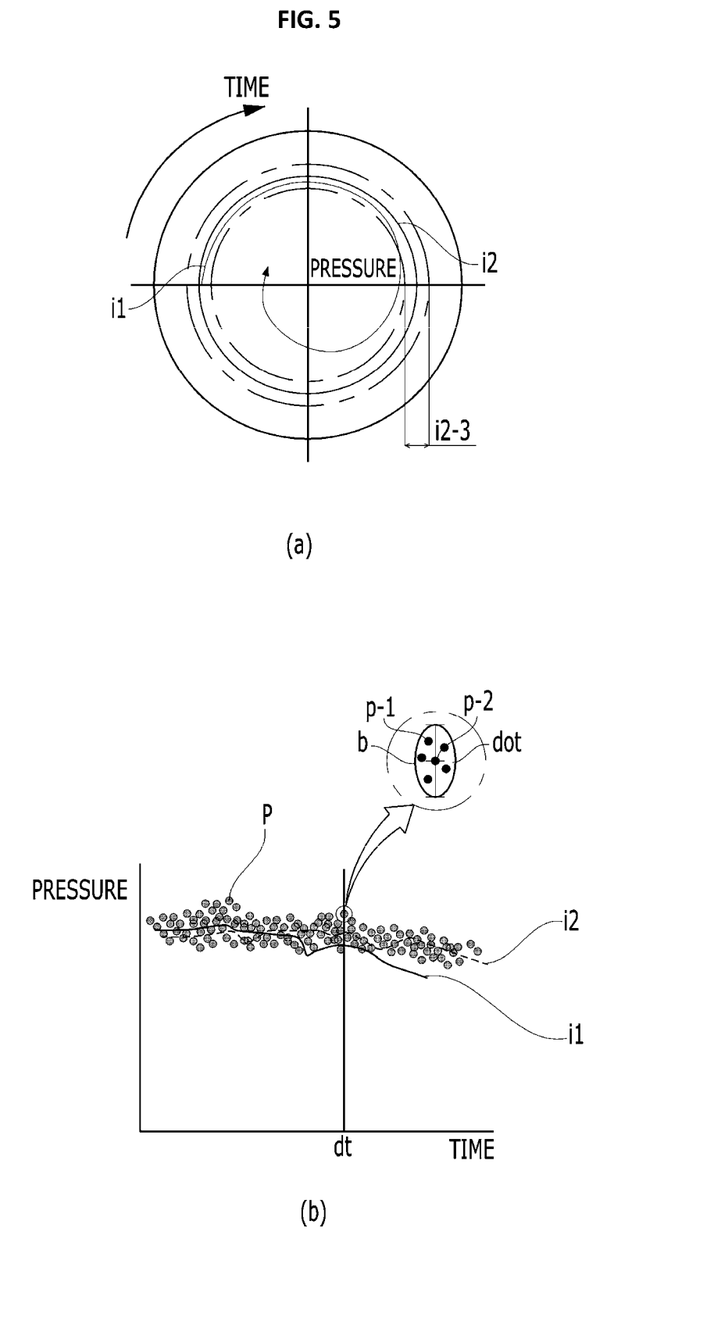
FIG. 5 is a diagram showing normal tubing pressure data and real-time tubing pressure data measured by a pressure sensing module according to an embodiment of the present disclosure.

FIG. 5 is a diagram showing normal tubing pressure data and real-time tubing pressure data measured by a pressure sensing module according to an embodiment of the present disclosure.

Figure 6:
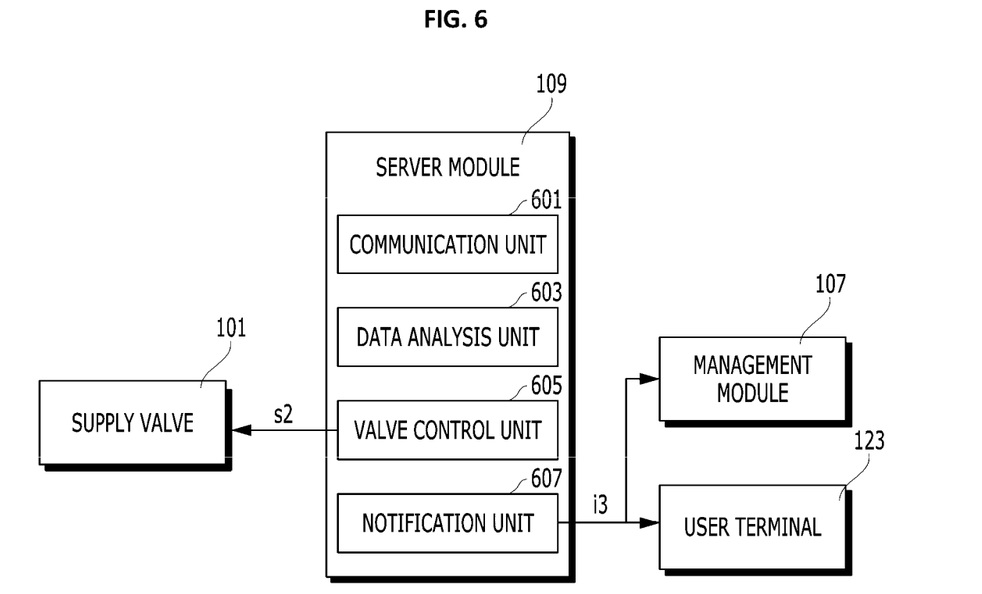
FIG. 6 is a block diagram showing a server module of FIG. 1 in more detail.

FIG. 6 is a block diagram showing a server module of FIG. 1 in more detail.

Figure 7:
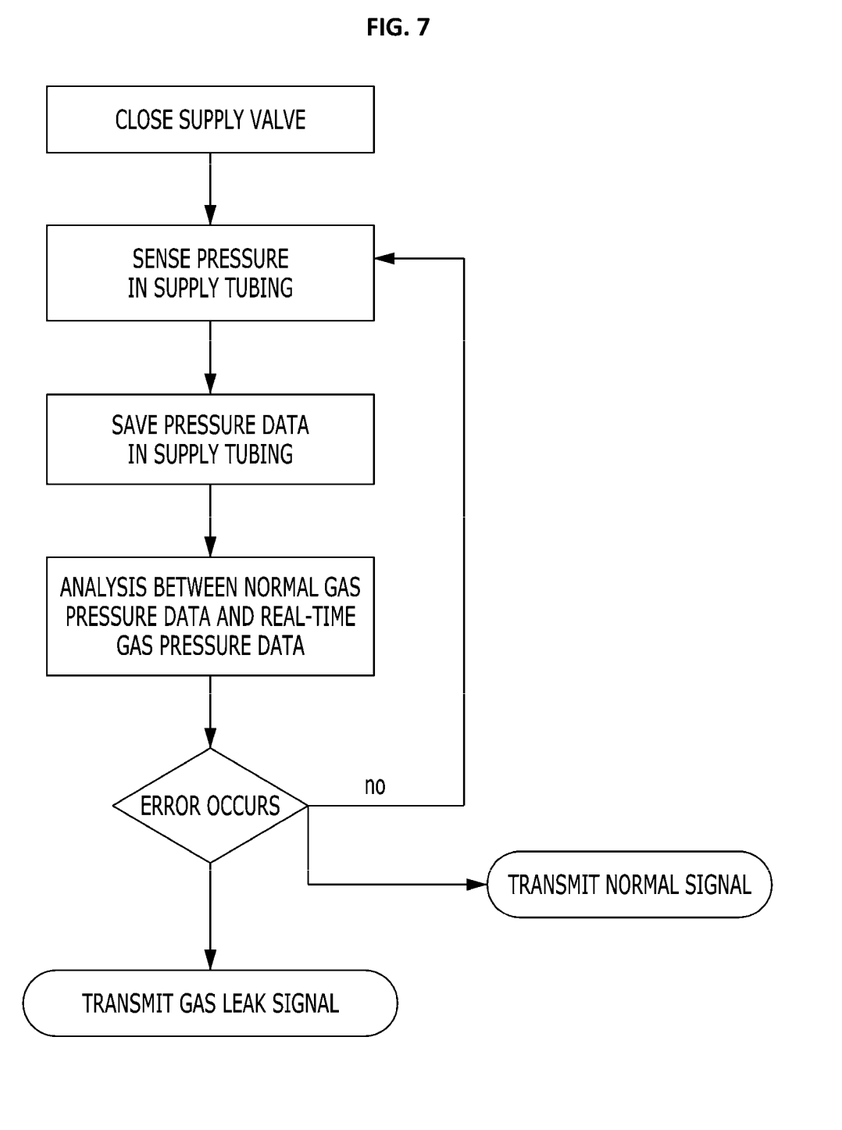
FIGS. 7 and 8 are diagrams showing an algorithm by which a safety action is performed by the gas leak monitoring system in a state where a supply tubing is closed or opened according to an embodiment of the present disclosure.
Figure 8:
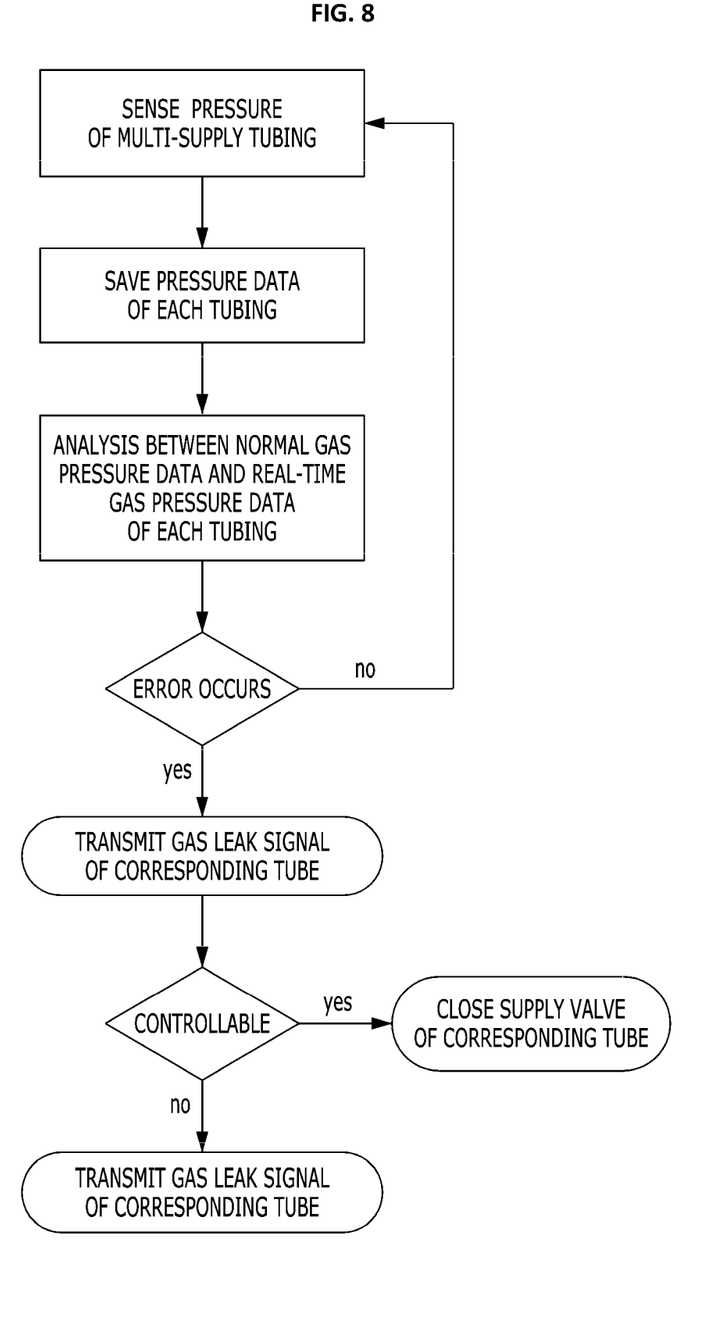

FIGS. 7 and 8 are diagrams showing an algorithm by which a safety action is performed by the gas leak monitoring system in a state where a supply tubing is closed or opened according to an embodiment of the present disclosure.

As shown in the figures, a gas leak monitoring system according to an embodiment of the present disclosure is a system for detecting a leak of gas supplied through a supply tubing 103 equipped with a supply valve 101 and includes a pressure sensing module 105 configured to check a pressure of the gas in the supply tubing 103 and output real-time tubing pressure data i1; a DB module 125 configured to save the real-time tubing pressure data i1 and normal tubing pressure data i2; and a server module 109 configured to analyze the real-time tubing pressure data i1 and the normal tubing pressure data i2 transmitted from the DB module 125, determine a gas leak state when the real-time tubing pressure data i1 deviates from the normal tubing pressure data i2, and perform one of safety actions to close the supply tubing 103 or transmit gas leak data i3 to a management module 107.

The supply tubing 103 is connected to a gas supply unit 111 and is supplied with gas from the gas supply unit 111. The gas supplied from the gas supply unit 111 is transferred to a gas distribution unit 113.

Here, as shown in FIG. 3, the gas supply unit 111 includes a gas storage unit 301 in which gas is stored, a residual gas detecting unit 303 for measuring a residual gas of the gas storage unit 301 and outputting a gas supplement notification signal s1, and an auto-changer 305 for controlling a gas supply amount according to the gas supplement notification signal s1.

The gas storage unit 301 supplies the stored gas to the gas distribution unit 113 through the supply tubing 103. The gas storage unit 301 may be provided in plural and may include, for example, may include a first gas storage unit 307 and a second gas storage unit 309.

As shown in FIG. 4, the residual gas detecting unit 303 includes a residual gas pressure gauge 401 moved in a circumferential direction according to the gas pressure of the gas storage unit 301, a residual quantity adjustment button 405 for moving the residual gas pressure gauge 401 in the circumferential direction, and a gas exchange notification unit 407 for outputting the gas supplement notification signal s1 to the server module 109 when the residual gas pressure gauge 401 is located at the residual gas notification gauge 403.

Here, if the gas supplement notification signal s1 is applied from the gas exchange notification unit 407, the server module 109 transmits gas exchange data i4 to the management module 107 and outputs a supply control signal s1-1 to the auto-changer 305, explained later.

Subsequently, the auto-changer 305 receives the supply control signal s1-1 from the server module 109 to control the gas supply amount so that the gas supplied from the gas storage unit 301 does not fall below a preset supply amount or pressure.

For example, if the residual gas stored in the first gas storage unit 307 falls below the preset residual gas notification gauge 403 and thus the gas supply amount falls below the preset supply amount, the residual gas detecting unit 303 may apply the gas supplement notification signal s1 to the server module 109, and the server module 109 applies the supply control signal s1-1 to the auto-changer 305. At this time, the auto-changer 305 controls the supply valve of the second gas storage unit 309 (e.g., by opening the supply valve) so that gas is supplied from the second gas storage unit 309 as much as the deficient amount.

As such, according to an embodiment of the present disclosure, a gas supplement threshold time may be arbitrarily set through the residual quantity adjustment button 303. Also, the residual gas pressure gauge 401 moved according to the residual gas amount is located at an arbitrarily set residual gas notification gauge 403. Thus, if the gas supply amount falls below the set value, the auto-changer 305 may control the plurality of gas storage units 301 to maintain a constant gas supply amount.

Meanwhile, the supply tubing 103 may be provided in plural. For example, the supply tubing 103 may include a main tubing 115 having one end connected to the gas supply unit 111, and a central tubing 117 having one end connected to the main tubing 115 and the other end connected to the gas distribution unit 113.

That is, the main tubing 115 supplies the gas from the gas supply unit 111 to the plurality of central tubings 117.

Thus, since the gas supplied to the main tubing 115 is distributed to the plurality of central tubings 117, the normal tubing pressure data i2 of the main tubing 115 and the central tubing 117 may be different. For example, if normal tubing pressure data i2-1 of the main tubing 115 is 1 bar, normal tubing pressure data i2-2 of the central tubing 117 may be 0.5 bar (if there are two central tubings 117).

Meanwhile, the supply tubing 103 includes a supply valve 101 for opening and closing the supply tubing 103 so that gas is supplied or closed from the gas supply unit 111.

For example, the supply valve 101 may be provided in plural. Seeing the structure of the supply valve 101 in more detail, the supply valve 101 includes: a main valve 119 provided to the main tubing 115 to open or close the main tubing 115 so that the gas is supplied from the gas supply unit 111 to the central tubing 117 or the gas supplied to the central tubing 117 is closed; and a central valve 121 provided to the central tubing 117 to open or close the central tubing 117 so that the gas is supplied from the main tubing 115 to the gas distribution unit 113 or the gas supplied to the gas distribution unit 113 is closed.

Here, the main valve 119 and the central valve 121 may be controlled by the management module 107, the server module 109 and a user terminal 123, respectively.

Meanwhile, the pressure sensing module 105 according to an embodiment of the present disclosure detects the pressure of the gas in the supply tubing 111 and outputs the real-time tubing pressure data i1 to the DB module 125, explained later.

Here, the pressure sensing module 105 detects the pressure of the gas moving through the supply tubing 103 in a state where the supply tubing 103 is opened so that the gas supplied from the gas supply unit 111 is fed to the gas distribution unit 113, and outputs the real-time tubing pressure data i1.

In addition, the pressure sensing module 105 detects the pressure of the gas remaining in the supply tubing 103 in a state where the supply tubing 103 is closed by the supply valve 101 so that gas is not supplied from the gas supply unit 111 to the gas distribution unit 113, and outputs the real-time tubing pressure data i1.

Here, in an embodiment of the present disclosure, the normal tubing pressure data i2 and the real-time tubing pressure data i1 may be set differently in a state where the supply tubing 103 is opened and closed by the supply valve 101.

Referring to 5(*a*), in a state where the supply tubing 103 is closed by the supply valve 101, the normal tubing pressure data i2 may be determined as a preset value without change. This normal tubing pressure data i2 may be set as a circle with a predetermined radius and may include an allowable error range i2-3 with a predetermined interval in the radial direction.

Here, the real-time tubing pressure data i1 according to an embodiment of the present disclosure may be output in a circumferential direction as shown in the figures, and if the real-time tubing pressure data i1 deviates from the preset normal tubing pressure data i2 or the preset allowable error range i2-3, it is determined as a gas leak state.

In addition, referring to (b) of FIG. 5, since the gas is being injected by the gas distribution unit 113 in a state where the supply tubing 103 is opened, the normal tubing pressure data i2 and the real-time tubing pressure data i1 may be measured and set differently depending on times (x-axis) or situations and saved in the DB module 125.

For example, in a state where the supply tubing 103 is opened, the normal tubing pressure data i2 may be set in advance and saved in the DB module 125, like the case where the supply tubing 103 is closed.

As another example, in a state where supply tubing 103 is opened, the normal tubing pressure data i2 may be set as a representative value (e.g., a statistical value or an average value) of a plurality of pressure values (P) measured during a preset time.

For example, the normal tubing pressure data i2 may be set as an average value (an average pressure) obtained by summing all of the plurality of pressure values (P) measured during the preset time and then dividing the same as 1/n.

At this time, in an embodiment of the present disclosure, as shown in (b) of FIG. 5, the pressure value (P) measured for a certain time may be output as a plurality of dots. Each dot may not be output to a circle due to various reasons such as temperature change or the like during a micro time (dt), and may include a plurality of measurement values (p-1) in a predetermined region (b).

Here, each normal tubing pressure data i2 and each real-time tubing pressure data i1 output during a predetermined time may be determined using a representative value (p-2) (e.g., a statistical value or an average value) among a plurality of measured values (p-1) output in a predetermined region (b) of the plurality of dots.

Meanwhile, in the present disclosure, the normal tubing pressure data i2 may be calculated using the representative value of the plurality of pressure values (P) measured during the preset time, and if an error range of the real-time tubing pressure data i1 and normal tubing pressure data i2 exceeds 5% to 10%, it may be determined as a gas leak state.

The normal tubing pressure data i2 and the real-time tubing pressure data i1 output by the pressure sensing module 105 are transmitted to and saved in the DB module 125, and they may also be transmitted to the management module 107 and the user terminal 123 and output as shown in FIG. 5.

Meanwhile, the pressure sensing module 105 may be provided in plural in a predetermined region of the supply tubing 103 based on the supply valve 101. Seeing an example of the structure of the pressure sensing module 105 in more detail, the pressure sensing module 105 includes a first pressure sensing module 201 provided to the main tubing 115 to output the real-time tubing pressure data i1-1 of the main tubing 115 in a state where the main tubing 115 is opened or closed, and a second pressure sensing module 203 provided to the central tubing 117 to output the real-time tubing pressure data i1-2 of the central tubing 117 in a state where the central tubing 117 is opened or closed.

In addition, if there is no gas leak in a state where the supply tubing 103 is opened or closed, the pressure sensing module 105 detects the pressure of the gas in the supply tubing 103 and outputs the normal tubing pressure data i2.

More specifically, if there is no gas leak, the first pressure sensing module 201 outputs the normal tubing pressure data i2-1 of the main tubing 115 to the DB module 125, and if there is no gas leak, the second pressure sensing module 203 outputs the normal tubing pressure data of i2-2 of the central tubing 117 to the DB module 125.

Meanwhile, the pressure sensing module 105 according to an embodiment of the present disclosure detects a gas supply amount and outputs gas supply amount data i5.

That is, the first pressure sensing module 201 outputs the gas supply amount data i5-1 of the main tubing 115 to the DB module 125, and the second pressure sensing module 203 outputs the gas supply amount data i5-2 of the central tubing 117 to the DB module 125.

Subsequently, the DB module 125 receives the normal tubing pressure data i2 and the real-time tubing pressure data i1 from the pressure sensing module 105 and transmits the accumulated normal tubing pressure data i2 and the accumulated real-time tubing pressure data i1 to the server module 109, explained later.

Meanwhile, the gas leak monitoring system according to an embodiment of the present disclosure further includes a communication module 124, and the communication module 124 allows the pressure sensing module 105, the DB module 125, a communication stream unit 204 and the server module 109 to exchange various data and signals with each other by means of wired/wireless communication.

Meanwhile, the gas leak monitoring system according to an embodiment of the present disclosure further includes a communication stream unit 204, and the communication stream unit 204 receives the real-time tubing pressure data i1, the normal tubing pressure data i2 and the gas supply amount data i5 from the pressure sensing module 105 and transmits the same to the DB module 125.

Meanwhile, the communication stream unit 204 stands by while saving the real-time tubing pressure data i1, the normal tubing pressure data i2 and the gas supply amount data i5 transmitted from the pressure sensing module 105. Here, if the DB module 125 fails to supply the various data to the server module 109 since the DB module 125 is damaged or an error and overload occurs at the DB module 125, the communication stream unit 204 directly supplies the real-time tubing pressure data i1, the normal tubing pressure data i2 and the gas supply amount data i5 saved therein to the server module 109.

Since the gas leak monitoring system according to an embodiment of the present disclosure includes the communication stream unit 204, which stands by in a state of saving various data transmitted from the pressure sensing module 105 and directly supplies the real-time tubing pressure data i1, the normal tubing pressure data i2 and the gas supply amount data i5 to the server module 109 at emergency as described above, it is possible to improve the independence and stability of data between the modules.

Subsequently, the server module 109 analyzes the real-time tubing pressure data i1 and the normal tubing pressure data i2 obtained from the DB module 125, and determines a gas leak state and perform a safety action if the real-time tubing pressure data i1 deviates from the normal tubing pressure data i2.

That is, if a gas leak is detected, the server module 109 performs at least one safety action to close the supply tubing 103 by means of the supply valve 101 or transmit the gas leak data i3 to the management module 107.

That is, the server module 109 analyzes the normal tubing pressure data i2 and the real-time tubing pressure data i1 in a state where gas is supplied from the gas supply unit 111 to the gas distribution unit 113, namely when gas is used, and in a state where gas is not supplied from the gas supply unit 111 to the gas distribution unit 113, namely when gas is not used, and then performs a safety action if the gas leak state is detected.

The server module 109 includes a communication unit 601, a data analysis unit 603, a valve control unit 605, and a notification unit 607.

Referring to FIG. 6, each component of the server module 109 will be described. The communication unit 601 allows the DB module 125, the user terminal 123, the gas supply unit 111 and the management module 107 to exchange various data and signals with each other by means of wired/wireless communication.

The data analysis unit 603 compares and analyzes the normal tubing pressure data i2 and the real-time tubing pressure data i1 transmitted from the DB module 125, and determines a gas leak state and controls at least one of the valve control unit 605 and the notification unit 607, explained later, if the real-time tubing pressure data i1 deviates from the normal tubing pressure data i2.

In addition, if the gas leak state is determined by the data analysis unit 603, the valve control unit 605 controls the supply valve 101 to close the supply tubing 103 by means of a valve control signal s2. At this time, the notification unit 607 transmits the gas leak data i3 to the management module 107 and the user terminal 123.

Meanwhile, the server module 109 will be described in more detail with reference to FIGS. 6 to 8. If the real-time tubing pressure data i1 deviates from the normal tubing pressure data i2 in a state where the supply tubing 103 is opened, the server module 109 closes the supply tubing 103 by means of the supply valve 101.

In addition, if the real-time tubing pressure data i1 deviates from the normal tubing pressure data i2 in a state where the supply tubing 103 is closed by the supply valve 101, the server module 109 transmits the gas leak data i3 to the management module 107.

That is, since the supply valve 101 may not be controlled in a state where the supply tubing 103 is closed, the notification unit 607 of the server module 109 transmits the gas leak data i3 to the management module 107 so that a manager may take a measure such as replacing the supply tubing 103.

At this time, the notification unit 607 transmits the gas leak data i3 to the user terminal 123 so that the manager may check the gas leak data i3 even when the manager is located at a distance from the management module 107.

In addition, if the real-time tubing pressure data i1 deviates from the normal tubing pressure data i2 in a state where the supply tubing 103 is open, the server module 109 closes the supply tubing 103 by means of the supply valve 101.

That is, if a gas leak is detected in a state where the supply tubing 103 is open, the valve control unit 605 of the server module 109 closes the supply tubing 103 by controlling the supply valve through the valve control signal s2.

At this time, the notification unit 607 of the server module 109 transmits the gas leak data i3 to the management module 107 and the user terminal 123 so that the manager may check the gas leak state.

Meanwhile, the server module 109 analyzes the normal tubing pressure data i2 and the real-time tubing pressure data i1 of each predetermined region, and detects a gas leak for each region.

More specifically, if the real-time tubing pressure data i1 of a predetermined region deviates from the normal tubing pressure data i2 in a state where the supply tubing 103 is closed by the supply valve 101, the server module 109 transmits the gas leak data i3 of the predetermined region to the management module 107.

For example, the server module 109 analyzes the normal tubing pressure data i2-1 with the real-time tubing pressure data i1-1 of the main tubing 115 in a state where the supply tubing 103 is closed, and then, if a gas leak is detected, the server module 109 transmits main tubing gas leak data i3-1 to the management module 107 and the user terminal 123. Also, the server module 109 analyzes the normal tubing pressure data i2-2 and the real-time tubing pressure data i1-2 of the central tubing 117, and then, if a gas leak is detected, the server module 109 transmits central tubing gas leak data i3-2 to the management module 107 and the user terminal 123.

Meanwhile, if the real-time tubing pressure data i1 of a predetermined region deviates from the normal tubing pressure data i2 in a state where the supply tubing 103 is opened, the server module 109 closes the supply tubing 103 of the predetermined region by means of the supply valve 101.

For example, the server module 109 analyzes the normal tubing pressure data i2-1 and the real-time tubing pressure data i1-1 of the main tubing 115 in a state where the supply tubing 103 is open when gas is used, and if a gas leak is detected, the server module 109 controls the main valve 119 to close the main tubing 115 through a main valve control signal s2-1. Also, the server module 109 analyzes the normal tubing pressure data i2-2 and the real-time tubing pressure data i1-2 of the central tubing 117, and if a gas leak is detected, the server module 109 controls the central valve 121 to close the central tubing 117 through a central valve control signal s2-2.

Here, the server module 109 may transmit gas leak data i3-1, i3-2 of the corresponding tubing where the gas leak is detected to the management module 107 and the user terminal 123.

Meanwhile, if it is determined that gas is not supplied to the corresponding supply tubing 103 by means of the gas supply amount data i5 when gas is used, the server module 109 according to an embodiment of the present disclosure controls the supply valve 101 to close the supply valve 101 through the valve control signal s2.

That is, if it is determined that gas is not supplied to any of the plurality of central tubings 117 through the gas supply amount data i5-2 of the corresponding central tubing 117 when gas is used, the server module 109 controls the central valve 121 to close the corresponding central tubing 117 through the central valve control signal s2-2.

As described above, according to an embodiment of the present invention configured as described above, the present disclosure may be easily applied to a laboratory where a large amount of gas is supplied, and also it is possible to economically and efficiently detect a gas leak. Moreover, when a gas leak occurs, it is possible to immediately check the gas leak and take a measure through the user terminal or the management module, thereby preventing large accidents caused by the gas leak in advance.

Here, the description of the present disclosure is not necessarily limited to the above embodiments, even though all of the components constituting the embodiment of the present disclosure are described as being combined into a single unit or operating in combination. In other words, within the scope of the present disclosure, all of the components may be selectively combined and operated.

In addition, the terms "comprise", "include" or "have" used above mean that the corresponding component is capable of including elements unless otherwise stated, and thus, it should be construed that it may further include other components, without including other components. All terms, including technical and scientific terms, have the same meaning as commonly understood by those skilled in the art, unless otherwise defined. Commonly used terms, such as those defined in a dictionary, should be construed as being consistent with the contextual meaning of the related art and shall not be construed in an ideal or overly formal sense unless explicitly stated in the present disclosure.

The above description is merely illustrative of the technical idea of the present disclosure, and a person skilled in the art may make various modifications and changes without departing from the essential characteristics of the present disclosure. Accordingly, the embodiments in the present disclosure are not intended to limit the technical scope of the present disclosure but to illustrate the present disclosure, and the scope of the present disclosure is not limited by these embodiments. The scope of the present disclosure should be defined by the appended claims, and any technical idea falling within the scope of the present disclosure shall be construed as being included in the scope of the present disclosure.

What is claimed is:

1. A gas leak monitoring system, comprising:
a supply tubing equipped with a supply valve;
a gas supply unit configured to be connected to the supply tubing to supply the gas to the supply tubing;
a pressure sensing module configured to detect a pressure of the gas in the supply tubing and output real-time tubing pressure data;
a database (DB) module configured to save the real-time tubing pressure data and normal tubing pressure data;
a server module configured to analyze the real-time tubing pressure data and the normal tubing pressure data transmitted from the DB module, determine a gas leak state when the real-time tubing pressure data deviates from the normal tubing pressure data, and perform different safety actions according to conditions of the supply tubing; and
a management module configured to receive gas leak data from the server module;
wherein, in a state where the supply tubing is closed by the supply valve, the server module transmits the gas leak data to the management module when the real-time tubing pressure data which is the pressure of the gas remaining in the supply tubing deviates from the normal tubing pressure data determined as a preset constant value; and
in a state where the supply tubing is opened, the server module closes the supply tubing by the supply valve when the real-time tubing pressure data which is the pressure of the gas moving through the supply tubing deviates from the normal tubing pressure data which is average value of the plurality of pressure values measured during the preset time; and
wherein the gas supply unit comprises a gas storage unit in which the gas is stored, a residual gas detecting unit configured to measure a residual gas of the gas storage unit and apply a gas supplement notification signal to the sever module when the gas supply amount falls below the preset supply amount.

2. The gas leak monitoring system according to claim 1, wherein the pressure sensing module is provided in plural in predetermined regions of the supply tubing based on the supply valve; and
the server module analyzes the normal tubing pressure data and the real-time tubing pressure data for each predetermined region.

3. The gas leak monitoring system according to claim 2, wherein, when the real-time tubing pressure data of at least one of the predetermined regions deviate from the normal tubing pressure data in a state where the supply tubing is closed by the supply valve, the server module transmits the gas leak data of the at least one of the predetermined regions to the management module.

4. The gas leak monitoring system according to claim 2, wherein, when the real-time tubing pressure data of at least one of the predetermined regions deviate from the normal tubing pressure data in a state where the supply tubing is opened, the server module closes the supply tubing of the at least one of the predetermined regions by the supply valve.

* * * * *